| United States Patent [19] | [11] | 4,116,911 |
|---|---|---|
| Miyahara et al. | [45] | Sep. 26, 1978 |

[54] REAR PROJECTION SCREENS

[75] Inventors: Junji Miyahara; Hisatoyo Kato, both of Minami-ashigara, Japan

[73] Assignee: Fuji Photo Film Co., Ltd., Minami-ashigara, Japan

[21] Appl. No.: 644,683

[22] Filed: Dec. 29, 1975

[30] Foreign Application Priority Data

Dec. 26, 1974 [JP] Japan ............................... 49-446

[51] Int. Cl.$^2$ .................. G03B 21/56; C08L 91/00
[52] U.S. Cl. .................... 260/28.5 A; 260/28.5 AV; 106/270; 350/117
[58] Field of Search ................ 350/117, 126, 125; 161/3.5; 106/270; 260/28.5 R, 28.5 A, 28.5 AV

[56] References Cited

U.S. PATENT DOCUMENTS

| 2,287,556 | 6/1942 | Land ................................... 350/126 |
| 3,372,971 | 3/1968 | Quackenbush et al. ......... 350/125 X |
| 3,573,141 | 3/1971 | Lu et al. ............................. 350/126 |
| 3,591,253 | 7/1971 | De Palma .......................... 350/126 |
| 3,682,530 | 8/1972 | De Palma et al. ................ 350/126 |
| 3,712,707 | 1/1973 | Henkes, Jr. ...................... 350/126 X |

*Primary Examiner*—Richard A. Wintercorn
*Attorney, Agent, or Firm*—Sughrue, Rothwell, Mion, Zinn and Macpeak

[57] ABSTRACT

A rear projection screen comprising a wax and a wax reforming agent which is miscible with the wax and is present in an amount effective to increase the mechanical strength and adhesiveness of the wax.

22 Claims, No Drawings

REAR PROJECTION SCREENS

BACKGROUND OF THE INVENTION

1. Field of the Invention

The present invention relates to a rear projection screen, more particularly, to a rear projection scrren employing wax as a main component.

2. Description of the Prior Art

A rear projection screen (hereinafter, a rear projection screen or screens will be referred to as an "RPS") is an optical element on which image information is projected from the side opposite to the viewers and on which image information can be reproduced. It is used for optical display devices, e.g., reading devices for microfilms, or projection devices for movies.

RPS are well known and are made by employing various materials and methods. They can be classified into the following types:

1. RPS having a matted surface (hereinafter referred to as a "mat type screen"),
2. RPS having a layer containing dispersed light-scattering particles (hereinafter referred to as a "dispersion type screen").
3. RPS having a wax layer sandwiched between two transparent supports (hereinafter referred to as a "wax type screen"), and
4. RPS employing a polymeric material with a crystalline structure (hereinafter referred to as a "crystalline polymer type screen").

With respect to the optical properties required for such RPS, it is important that they have:

(1) little or no scintillation,
(2) a broad image reproduction range,
(3) good light-redistribution capability (diffusing capability), and
(4) high resolving power.

The term "scintillation" means the phenomenon that innumerable light-spots formed on the RPS glitter as a viewer moves his eyes along the RPS. Scintillation fatigues the eye viewers, and is a serious problem in microfilm viewing. One of the most serious problems in the optical properties of RPS is their scintillation.

The term "image reproduction range" is a characteristic value showing the density range which images projected on a screen can reproduce, and is defined as follows $$\text{Image reproduction range} = \log\left[\frac{\text{Maximum luminance on the screen}}{\text{Minimum luminance on the screen}}\right]$$

This evaluation factor has hitherto been called "contrast", and the inventors consider this an important factor where continuous tone images are to be faithfully reproduced.

The image density range of light-sensitive photographic films is from about 3.0 to 4.0 or more, and thus includes the image density region of 2.5 to 3.0 which can be detected by the naked eye. However, the image reproduction range of commercially available RPS is 1.2 to 1.6, and hence commercially available RPS cannot faithfully reproduce image information from an original.

In order to increase the image reproduction range, RPS must have a high diffuse transmittance and a low diffuse reflectance. The former increases the maximum screen luminance, and the latter reduces the minimum screen luminance because reflected room light is lower, and the latter simultaneously increases maximum screen luminance because it lowers loss of light from the light source on the screen.

Ther term "light redistribution capability (diffusion capability)" ideally means that where image information is projected on an RPS, the image reproduction range of the screen does not vary, even if it is observed from any direction. In general, it is desired that lumininance distribution on the screen be uniform observed from any direction. In order to practically obtain the desired illuminance distribution, the diffusion capability of an RPS should be close to that of opal glass, in which incident light is scattered uniformly in all directions, or an RPS should be used together with an optical element which has the function that light is uniformly distibuted only the on areas to be observed.

In order to evaluate the "light redistribution property" of an RPS, the inventors have used the incident angle ($\theta_{\frac{1}{2}}$); the incident angle shows the angle at which the luminance is reduced to $\frac{1}{2}$ of that when light is exposed at a right angle onto the RPS. For example, when $\theta_{\frac{1}{2}}$ is 25°, the luminance of the screen at 25° is $\frac{1}{2}$ the luminance in the case of right angle incident light.

The term "resolving power" means the number of lines per 1 mm resolved on the RPS. This value is decided on the basis of the resolving capacity of the naked eye, and is not less than the capacity of the naked eye.

The most serious defects of a mat type screen are high glare and a narrow image reproduction range. The reason for these defects is based on the fact that light-scattering is hardly caused on the matted surface of the screen, that is, at the surface where the refractive index difference between air and the screen is large. Further, since light-scattering occurs on only the surface of the screen, scratches on the matted surface are conspicuous and lower the commercial value of the screen. Since light-scattering occurs on only surface of the screen, it is difficult to provide a desired diffusion capability to the screen.

The most serious defect of dispersion type screens is high scintillation. In order to decrease the scintillation of the screen, it has been considered to increase the number of light-scattering particles per unit area (i.e., particle density) by reducing the particle size and to reduce the difference in refractive index between the binder and the particles therein (see Japanese Patent Application (OPI) 2127/71 and U.S. Pat. No. 3,712,707); while scintillation can be decreased, resolving power is reduced, diffuse reflectance increased and diffuse transmittance decreased, whereby the image reproduction range is markedly lowered. In fact, since the resolving power becomes substantially the same as in the thickness of the diffusion layer in the system, the thickness of the diffusion layer must be limited to about 100 microns to obtain a resolving power of about 10 lines/mm, which is close to the resolving capacity of the naked eye. It is therefore impossible to overcome the scintillation problem in such a system because the factors in lowering scintillation and increasing the reproduction range and resolving power are opposed. Dispersion type screens can be prepared by uniformly coating a coating composition containing dispersed light-scattering particles onto a transparent support such as an acrylic resin plate or a glass plate and then drying. However, it is not easy to uniformly coat a layer having a thickness of 100 microns or less and an area of at least 30 cm × 30 cm on a hard transparent support, and high precision machinery is needed.

On the other hand, wax type screens have excellent optical properties as compared with the other type of screens. Particularly, they have substantially no scintillation and have a broad image reproduction range. It is surprising that even if the thickness of the light-scattering layer in a wax type screen is 1 to 2 mm, the resolving power is not reduced, while it is difficult to make the thickness of the light-scattering layer in a dispersion type screen greater than 0.1 mm. The surprising particular optical properties of wax type screens depend on the physical properties of the wax itself.

Wax can have complicated crystal shapes (e.g., twig shaped, needle shaped, plate shaped, block shaped, etc.). Depending on the crystallization conditions, there is a small density difference (refractive index) between crystalline regions or between crystalline areas and non-crystalline areas, and the refractive index continuously changes at the interface thereof, whereby incident light is passed through a complicated density zone in the light diffusion layer with multi-refraction and multi-scattering without overall reflection, so that light is not reflected to the incident direction.

However, a wax per se cannot be molded into a thin sheet because it is very soft and fragile, and so it cannot be used unless it is sandwiched between two transparent supports. It is desired in RPS construction that the number of the surfaces be as low as possible between a light diffusion layer and a transparent support, because loss of light is caused at the interface between substances having different refractive indices. Accordingly, the structure of a conventional wax type screen makes the production of such a screen difficult and inherently lowers the optical properties thereof. Further, such a screen has the serious disadvantage that the wax layer is easily stripped from the support or cracks with the passage of time because adhesion to the transparent support is weak due to the chemical inactivity and fragile nature of the wax. Therefore, though wax type screens have remarkably excellent optical properties, they have not been used on a commercial scale.

A crystalline polymer type RPS has better optical properties than a dispersion type RPS, but has worse scintillation and a poorer image reproduction range than a wax type RPS. This is due to the fact that as molecular weight increases the length of the molecule is longer and the viscosity of the molten substance is higher, whereby a complicated crystalline structure, such as in wax, cannot be formed by crystallization, rather, a micro-level structure of crystalline spherulites is formed, which degrades the optical properties of the screen.

In order to overcome this defect, other techniques for deforming such a crystalline spherulite structure are necessary, and such are disclosed in Japanese Patent Publication 19,257/73 and U.S. Pat. Nos. 3,573,141, 3,591,253 and 3,682,530).

High molecular weight substances have the advantages of film-forming capability and a more excellent mechanical strength than wax, but molding such substances into sheets costs more because larger apparatus for rolling, extrusion or injection molding are needed and production costs increase.

SUMMARY OF THE INVENTION

Therefore, one object of the invention is to provide an improved wax type screen.

Another object of the invention is to provide a molded wax sheet having improved mechanical strength and excellent optical properties.

Still another object of the invention is to provide a wax type screen having an increased mechanical strength, reproduction range and redistribution capability which can be easily used in combination with other optical elements.

A further object of the invention is to provide a wax type screen which is not easily scratched or cracked and which is hard, having improved stability with the passage of time.

A still further object of the invention is to improve the chemical inertness of wax without changing the excellent optical properties which wax inherently has, to increase the adhesiveness of a wax sheet to sheets made of other materials, and to prevent wax sheets from being stripped from other transparent sheets with the passage of time.

Yet another object of the invention is to supply a wax type screen at low cost having excellent optical properties, mechanical strength and improved adhesiveness.

These objects of the invention are attained by adding a polymer miscible with wax as a wax reforming agent to the wax.

DESCRIPTION OF THE PREFERRED EMBODIMENTS

Wax has been used for producing candles and in various industries, for example, in paper making rubber production and cosmetics. In these industries, it has also been known that polymers miscible with wax can be added thereto as a wax reforming agent in order to improve the low mechanical strength of wax.

However, technics for reforming wax are not known in the optical screen art, and it has not been known that the low mechanical strength of wax could be improved without changing the optical properties thereof by employing such wax reforming techniques.

The present invention is based on the discovery that a wax type screen having improved mechanical strength and adhesive properties can be obtained without losing the excellent optical properties inherent to wax by adding one or more polymers miscible with the wax to the wax, most typically materials having solubility parameters which are extremely close or substantially identical to that of the wax(es) involved.

A "wax" used in this invention is solid having a waxy external appearance and a waxy properties at normal room temperature, for example, it is semi-transparent, soft, fragile and non-film-forming. Examples thereof are given below.

(I) Natural wax (supplied from animals and plants)
Japan wax, carnauba wax or cotton wax (plant wax); insect wax, bees wax or whale wax (animal wax).
(II) Petroleum wax (which is a solid hydrocarbon at normal room temperature obtained from petroleum) such as
paraffin wax having a boiling point of not less than 125° F., microcrystalline wax (e.g., Hi-Mic produced by Nippon Seiro Co.).
(III) Synthetic waxes (wax-like solids obtained by synthesis) such as
oligomer waxes, e.g., ethylene oxide oligomer waxes, propylene oxide oligomer waxes, vinyl oligomer wax such as ethylene oligomer waxes propylene oligomer waxes, and mixtures thereof. Ethylene oxide oligomer wax is sold as Carbowax by E. I. du Pont de Nemours & Co., Inc. Vinyl oligomer waxes have a molecular weight of not more than about 10,000, preferably not more than 5,000. The oligomer waxes employed in this invention are solids having a waxy external appearance and waxy properties and have a melt index of not less than about 1,000 (according to the method of JISK 6760 (1971)).

As should be apparent to one skilled in the art, mixtures of various compatible waxes as set forth above can be used as desired. Further, mixtures of various compatible wax reforming agents as will be now described can also be used, if desired.

As typical examples of wax reforming agents (for improving the mechanical strength and adhesiveness of wax without losing the excellent optical properties of wax) which are polymers miscible with the wax, there are:

(I) Natural substances and derivatives thereof such as rosins (e.g., rosin, modified rosin or rosin esters), terpene resins, terpene phenol resins and other natural resins.

(II) Synthetic resins such as resins containing polar groups (e.g., phenolic resins or xylenic resins), petroleum resins (e.g., aliphatic, alicyclic or aromatic petroleum resins), cumarone indene resins or styrene resins. More preferred materials are ethylene-vinyl acetate copolymers (hereinafter referred to as "EVA"), polyisobutylene (preferred molecular weight: about 35,000 to about 2,100,000), polybutene (preferred molecular weight: about 500 to about 3,000), rosin and atactic polypropylene. Preferred EVA's contain about 15 to about 40 wt% vinyl acetate and have a melt index of about 200 to about 400 (by JISK 6760 (1971)), for example, "Evaflex" manufactured and sold by Mitsui Polychemical Co., Ltd. One useful polyisobutylene is available as "Vistanex" manufactured by Esso Co., Ltd.

By adding these wax reforming agents, the mechanical strength and adhesiveness of wax are increased without losing the excellent optical properties which wax inherently has.

More specifically, in accordance with the present invention the mechanical strengthes of a wax such as the tensile strength, the compressive strength, the fatigue strength and the like can be improved, even more specifically, such valuable mechanical strengths can be retained with the passage of time and at elevated temperatures.

The amount of the wax reforming agent added is about 0.1 to about 80 wt%, based on the total weight of wax and all additives. For instance 1 to 50 wt% EVA, 0.5 to 20 wt% polyisobutylene and 1 to 30 wt% polybutene (some basis) can be used to form highly preferred systems. Where the difference of refractive index between the wax reforming agent and the wax is small, whereby mechanical strength and adhesiveness are increased without losing optical properties, larger amounts of the wax reforming agent can be added.

Where the amount of the wax reforming agent is less than about 0.1 wt%, the mechanical strength of the wax screen does not increase, and where the amount is equal to or more than about 80 wt%, the reproduction range and resolving capability decrease. The wax reforming agent can be used alone or as a mixture thereof.

Any method can be used to add the wax reforming agent to the wax, but preferably the wax reforming agent is gradually added with stirring to molten wax. For example, when EVA is added to paraffin wax, the paraffin wax is melted at about 120° C., and then pellets of EVA are gradually added to the molten paraffin with stirring. After sufficient stirring, the viscosity of the molten mixture is measured. When the viscosity is constant, EVA is completely dissolved in the paraffin. After the pellets are completely dissolved, the next small amount of pellets is added with stirring.

Additives other than the wax reforming agent can also be present. For example, conventional antioxidants and ultraviolet absorbants can be added to improve the stability of wax the with the passage of time.

Any antioxidant can be used so long as it is miscible with wax and does not affect the optical properties of the wax. As examples of the antioxidants, there are phenol type antioxidants such as 4,4'-butylidene-bis-(6-tert-butyl-3-methylphenol), alkylated-bisphenols, 2,4,5-trihydroxybutyrophenone, 2,6-di-tert-butylphenol, 2,6-di-tert-butyl-p-cresol (Sumilizer BHT manufactured by Sumitomo Chemical Co.), 2,2'-methylene-bis-(6-tert-butyl-4-methylphenol) (Sumilizer MDP manufactured by Sumitomo Chemical Co.), 2,6-di-tert-butyl-alpha-dimethylamino-p-cresol ("Ethyl" Antioxidant 703 manufactured by Ethyl Corp), 4,4'-bis-(2,6-di-tert-butyl-phenol) ("Ethyl" Antioxidant 712, manufactured by Ethyl Corp.), 4,4'-methylene-bis-(2,6-di-tert-butyl-phenol) ("Ethyl" Antioxidant 702 manufactured by Ethyl Corp.), etc.; amine type antioxidants such as N,N'-di-beta-naphthyl-p-phenylenediamine; organic phosphorus type antioxidants such as tris-nonylphenyl phosphite; and other antioxidants such as distearyl thiodipropionate, dilauryl thiodiproionate, triazine derivatives, 2-mercaptobenzimidazole, etc. The amount of antioxidant added is usually about 0.005 to about 3.0 wt%, preferably 0.01 to 1.0 wt%, based on the total weight of wax and all additives. Of course, the antioxidants can be used alone or as combinations thereof.

Any ultraviolet absorbant can be used so long as it is miscible with wax and does not harmfully affect the optical properties thereof. As examples of ultraviolet absorbants, there are salicylic acid derivatives such as p-octylphenyl salicylate; benzophenone derivatives such as 2-hydroxy-4-octoxybenzophenone (Sumisoap R 130 manufactured by Sumitomo Chemical Co.), 2-hydroxy-4-octadecyloxybenzophenone, 4-dodecyloxy-2-hydroxybenzophenone; benzotriazole derivatives such as 2-(2'-hydroxy-4'-n-octyloxyphenyl)benzotriazole (e.g., Sumisoap R 510 manufactured by Sumitomo Chemical Co.); nickel bis-octylphenyl sulfide; substituted acrylonitrile; aromatic ester compounds; organic phosphorus compounds; organic sulfur compounds, etc.

The amount of ultraviolet absorbant added is usually about 0.01 to about 1.0 wt%, based on the total weight of wax and all additives. More than one ultraviolet absorbent can be added, if desired.

Further, one or more coloring agents can be added to wax for the purposes of varying the color temperature of the screen, adjusting the color hue thereof or to increase the image reproduction range by protecting the screen from reflected room light.

As examples of coloring agents, there are Toluidine Blue, Brilliant Acid Blue, Cyanine Blue, First Light Red, Super Chrome Yellow, Ethyl Orange and other dyes; titanium oxide, carbon black, cadmium red, barium yellow, cobalt green, manganese violet and other inorganic pigments; Vulcan orange, Lake Red and other azo pigments; nitroso pigments; nitro pigments; basic dye Lakes; acidic dye Lakes; phthalocyanine pigments; fluorescent pigments, etc.

Further, in order to improve only the mechanical strength of wax, polyethylene, polypropylene and polystyrene can be used.

Several preparation methods for wax type screens will now be given.

To the melted mixture of wax and wax reforming agent, other additives are added, if desired. The melted mixture is completely defoamed by vacuum defoaming, ultrasonic defoaming or by allowing the same to stand. After defoaming, the mixture is molded into a sheet by a conventional casting, extrusion or injection molding method. The mixture is then cooled and solidified at a cooling rate of about 5° to about 30° C./min. Where the cooling rate is more than the above range, crystallized regions become fine and the light-diffusing property is worsened, while where the cooling rate is less than the above range, the crystallized areas become larger and can be seen by the naked eye, remaining as spots on the RPS.

In the case of a casting method, two plates such as glass plates (of a thickness of about 5 to about 10 mm) or metal plates are provided so that the distance between them is controlled and three edges of the plates are sealed. The melted mixture is carefully and gradually poured into the space between the two plates via the remaining free edge so that air is not entrapped in the space, and, after cooling the poured mixture, a molded wax sheet is obtained.

The molten mixture can also be poured into a sheet-like container having a bottom plate and a small depth, and, after overflowing, another plate made of the same material as the container covers the container, whereafter the mixture is cooled at a cooling rate of about 5° to about 30° C./minute to obtain the molded wax sheet. In this case, if the surface of the plate is matted, the wax sheet obtained further has a matted surface, whereby the optical properties of the wax screen are further improved.

Wax sheets can thus be molded to a suitable thickness, preferably about 0.2 to about 2.0 mm, more preferably 0.3 to 0.8 mm.

The thus obtained wax sheets can be used per se as a screen without a support because they have improved mechanical strength, or can be used by adhering them to a transparent support. Where they are of particularly large size, they are used as RPS which are prepared by laminating the wax sheets to a transparent support, such as glass plate or an organic high molecular weight polymer film, e.g., a film of an acrylic resin, polystyrene resin, polycarbonate resin, polyvinyl chloride resin, polyethylene terephthalate resin, polyethylene naphthalate resin, etc., without entrapping air at the face between the sheet and the support.

In lamination, a suitable adhesive can be used to adhere the wax sheets and the support. It is preferred to employ a transparent adhesive, but the adhesive may be colored if the thin layer of the adhesive has no influence on the screen.

Preferred adhesives are a rubber adhesives such as polyisobutylene, a polyurethane adhesive, a hot-melt adhesive (e.g., "Olefine" manufactured by Showa Denko Co.), photo-hardening adhesives, etc. Preferred photo-hardening adhesives are liquid compositions which mainly comprise a photo-polymerizable monomer or oligomer.

A preferred thickness for the adhesive layer is not more than about 100 microns, and the thinner the layer, the better the optical properties.

One surface or both surfaces of the wax sheet is preferably matted to prevent light-reflection and increase adhesiveness. Even if the wax sheet is matted, scintillation is not increased (with mat type RPS increased scintillation is encountered, however). In order to obtain more preferred light-redistribution capability, an optical element surface structure such as a lenticular lens, Fresnel lens or fly eye lens-like structure can be provided on the surface of the wax sheet, for example, following the processes as taught in the U.S. Pat. Nos. 2,408,031; 3,712,707; 3,765,281; or 3,786,171. It has been difficult to provide an optical element surface structure on a surface of a light-diffusing layer in mat type screens and dispersion type screens due to the fact that in dispersion type screens it is difficult to make the thickness of the light-diffusing layer 100 microns or greater because of limitation on resolving power. If a surface structure such as a lenticular lens or Fresnel lens having an unevenness of 100 microns or greater (that is, the greatest vertical dimension between any valley and any peak in the structure) is provided on a thin diffusing layer, there is no diffusing layer in low areas and there is a thick diffusing layer in high areas, so that uneven light-diffusion and markedly increased scintillation are caused to deteriorate the optical properties of the RPS. On the contrary, since the thickness of the diffusing layer in wax type screens can be 10 to 20 times greater than that of a dispersion type screen without affecting the resolving power and image reproduction range, an optical element surface structure having convex and concave surfaces can be formed. In this case, scintillation is not increased at all.

Where a transparent support is employed, it is preferred that it be colored so as to uniformly or selectively adsorb light and that at least one surface thereof be matted to prevent reflection and increase adhesiveness.

A wax type RPS is not, as of this date, commercially available because of the inferior stability thereof for commercial use, i.e., the wax layer tears from the support, or is easily broken by pressure or by heating during use, though it has more excellent optical properties than a mat type RPS, a dispersion type RPS and a crystalline polymer type RPS. However, the wax type screen of this invention provides a product which is highly desirable for commercial use, i.e., wherein the wax layer is not torn from the support during use or broken by pressure or heating during use, and which is the same as or better than other RPS, and provides improved optical properties of the screen by combining the optical properties of wax type RPS with an optical element surface structure. According to the present invention, an excellent wax type RPS can be supplied at low price.

With the present invention, the following advantages are obtained.

Conventional wax type RPS cannot be obtained if wax is not sandwiched between two transparent supports, but wax molded as a sheet can be used as a RPS with or without a transparent support.

Conventional wax type RPS have the disadvantages that their properties worsen with the passage of time, for example, the wax layer is stripped from a transparent support or is cracked or the optical properties of the screen deteriorate, but the wax type RPS of this invention is not stripped even if the wax sheet is adhered to a transparent support, and has improved mechanical strength and superior stability with the passage of time due to mixing a polymer with the wax.

Conventional wax type RPS cannot be formed into sheet, but the wax type RPS of the invention can be formed into a sheet. As a result, light-redistribution capability can be controlled and a broader image reproduction range can be obtained without scintillation, even if a convex and concave optical element surface structure is directly formed thereon due to the superior properties of a wax type RPS, i.e., superior scinllation, image reproduction range and resolving power are not affected even if the thickness of the diffusing layer is 10 to 20 times more than that of a dispersion type screen. By these advantages, superior RPS having highly desirable properties can be manufactured at low cost, e.g., which uniformly distributes light on a broad horizontal axis when a plurality of viewers are involved.

Since the wax type RPS of this invention have a high diffuse transmittance and a low diffuse reflectance, they provide higher screen luminanse even if the viewing environment is light and a light source of low power is employed. As a result, the screen can be colored to a desired color hue at high density, whereby image contrast markedly increases in the light and a broad image reproduction range is obtained in luminance areas, whereby the eye is not fatigued by extended viewing. This reduces fatigue in viewing optical displays such as for reading microfilm.

Further, since the wax type RPS of this invention has a broad image reproduction range without scintillation, one can accurately reproduce photographic films of a broad density range thereon. By utilizing the excellent properties that the screen is not affected by room light, a new optical display device which has heretofore been impossible to realize can be produced. For example, a surface of a screen in a conventional image display device is arranged vertically or downward to prevent it from being influenced by external light (mainly ceiling lamps). However, in some display devices, such an arrangement puts viewers in an uncomfortable position. A wax type RPS of this invention is not limited in screen arrangement because of its broad image reproduction range. For example, an image display device having a screen on the surface of desk can be used.

A wax type RPS of this invention is useful for various image display devices, for example, microfilm reading devices or movie projection devices and devices which require uniform luminance, for example, signal lamps, X-ray-film viewing devices, lamp shades and other optical display devices, by utilizing the particular optical properties thereof.

This invention will now be illustrated in detail by several non-limiting Examples. Unless otherwise indicated, all parts are by weight in the following Examples.

The waxes used in Examples 1 and 3 had the following properties:

EXAMPLE 1

| Microcrystalline Wax | | | |
| --- | --- | --- | --- |
| Melting Point | ASTM D127 | 205° F | (96.1° C) |
| Penetration | ASTM D1321 | 25° C | 7 |
| | | 35° C | 10 |
| | | 45° C | 17 |
| Viscosity | ASTM D445 | 98.9° C | 17.5 cp |
| Refractive Index | ASTM D1747 | 100° C | 1.4420 |
| Specific Gravity | | 100° C | 0.787 |

EXAMPLE 3

| Synthetic Wax | | |
| --- | --- | --- |
| Viscosity | | 140° C | 4,300 cp |
| Softening Point | JISK 2531/'60 | 111° C |
| Penetration | JISK 2530/'60 | 25° C 2 |
| | | (100 g for 5 sec.) |
| Specific Gravity | JISK 6760/'66 | 20° C 0.93 |

EXAMPLE 1

100 parts of microcrystalline wax was melted at 140° C., 0.3 part of 2,6-di-tert-butyl-p-cresol (Trade Name: Sumilizer BHT manufactured by Sumitomo Chemical Co., an antioxidant) and 0.1 part of 2-hydroxy-4-octoxybenzophenone (Trade Name: Sumisoap R 130 manufactured by Sumitomo Chemical Co., an ultraviolet absorbant) were added to the melted wax with stirring, and then the mixture was poured into a 0.70 mm space provided between two stainless steel (40 cm × 40 cm) which were heated to 140° C. and on which Teflon FEP (manufactured by E. I. du Pont de Nemours & Co., Inc.) had been coated to permit the poured wax to be easily peeled off from the stainless steel. The mixture poured into the space between the stainless steels was cooled at 30° C./minute to 120° C., and then after being held for 1 hour at 120° C., it was cooled to room temperature at a cooling rate of 20° C./min. The stainless steels were then carefully stripped away to obtain wax screen A.

100 parts of microcrystalline wax as above was melted at 140° C., and 0.3 part of Sumilizer BHT (antioxidant) and 0.1 part of Sumisoap R 130 (ultraviolet absorbant) were added to the melted wax with stirring, whereafter 10 parts of Evaflex ethylenevinyl acetate copolymer (containing 80 mol% ethylene and 20 mol% vinyl acetate, density of 0.94 g/cm$^3$ (ASTMD 1505); Vicat softening temperature 42° C.) was carefully added such that it was completely dissolved, followed by the same procedure as in the preparation of the wax screen A to obtain wax screen B. Wax screen B was more easily stripped from the stainless steel than wax screen A. Wax screen B further had high flexibility while wax screen A easily snapped so that it could not be held by one hand horizontally.

In order to estimate the mechanical strength of the screens, strips of wax screens A and B (width 10 mm and length 100 mm) were bent and the angles at which they broke were measured. As a result, wax screen A snapped at an angle of 20° while wax screen B did not snap even at a 180° angle, i.e., wax screen B of the invention had increased mechanical strength.

Further, in order to estimate the adhesion thereof, a weak boundary layer which was present on the surface of the screens (as is well known in the art, when "plastic" sheets are formed a thin layer of relatively weak strength is formed on the surface of the sheet since lower molecular weight materials diffuse to the surface or near to the surface and are oxidized; generally this layer is removed since the strength thereof is low) was removed and then an adhesive tape (width 12 mm; Nichiban Cellotape) was adhered to the surface of the screens, and the striping strength measured by pulling the tape from the surface of the screen at a right angle. As a result, wax screen A was stripped by a load of 30 g while wax screen B was not stripped by a load of 120 g, i.e., wax screen B had improved adhesion, which capability was benefical when the wax screen was adhered to a transparent support such as a glass plate or an acrylic resin plate to increase the mechanical strength thereof.

Further, a lenticular structure having a radius of 0.11 mm and a pitch of 0.1 mm (a lenticular structure comprising a series of repeating hemispheres wherein the center-to-center distance between repeating hemispheres is the pitch) was pressed at 60° C. under 80 Kg/cm² for 5 minutes pressure on one surface of a wax screen prepared in the same manner as was screen B to obtain wax screen C.

The optical properties of wax screens A, B and C were measured in a room where the illumination on the surface of the screens was 250 lux; the results are shown in Table 1.

Table 1

|  | Screen A | Screen B | Screen C |
|---|---|---|---|
| Glare | ⊚ | ⊚ | ⊚ |
| Image reproduction range | 2.7 | 2.6 | 2.6 |
| Diffusing capability (⊖¼) | 18° | 20° | (⊥) 31° (∥) 20° |
| Resolving power | not less than 13.5 | not less than 13.5 | not less than 10 |

The symbol ⊖ means substantially no scintillation was observed.

(Image reproduction range was measured at the center of the screen)

Was screen B was substantially the same as wax screen A in optical properties. On the other hand, wax screen C having a lenticular structure had a different diffusing capability in the longitudinal direction (∥) and at a right angle (⊥) to the lenticular lens, in which the former was same as wax screen B but the latter was higher. The resolving power of wax screen C was limited by the pitch of the lenticular lens, but such a limitation caused no practical problems. The broad diffusing capability of wax screen C was highly effective where many viewers were to observe the images on the screen simultaneously.

EXAMPLE 2

100 parts of paraffin wax (m.p.: 155° F.) was melted at 140° C., and into the melted wax 5 parts of Evaflex and 2 parts of Vistanex (polyisobutylene; MW 64,000 to 81,000) were gradually added with stirring, followed by the same procedure as in Example 1 to obtain a wax screen. The screen had an improved bendening angle to snap and striping strength to adhesive tape than a wax type screen containing only paraffin wax. No optical properties were adversely affected.

EXAMPLE 3

100 parts of synthetic wax (oligoethylene wax having a melt index of 4 × 10³; JISK 6760 (1971) was melted at 160° C., and into the melted wax 2 parts of Vistanex as in Example 2 dissolved in 4 parts of toluene was added with stirring, and then 2 parts of polyethylene having a melt index of 30 and a density of 0.92 g/cm³ according to JISK 6760 (1971) was mixed therewith, whereafter toluene was removed by evaporation. The melted mixture was poured into an extrusion hopper heated to 160° C. and extruded onto a horizontal stainless steel plate (having a surface layer of Telfon and being heated to 100° C.) to a thickness of a 0.75 mm. After extrusion, the stainless steel plate was horizontally moved into a cooling zone and the extruded layer cooled at a rate of 20° C./min to room temperature.

The layer was allowed to stand for 10 minutes in a heating zone at 60° C., and was then cooled at 30° C./minute in air to room temperature to obtain a wax sheet. The wax sheet was laminated onto a transparent acrylic resin plate (having a nonglare surface and a thickness of 3 mm which had been dyed with carbon black so that the transmissivity thereof was 40%), by applying a 30μ layer of adhesive Zonne 1039 (an oligomer ester-acrylate adhesive manufactured by Kansai Paint Co., Ltd.) to the resin plate and then laminating the wax sheet thereto to obtain a wax screen.

The thus obtained wax screen had optical properties the same as the screen of Example 1. A particularly preferred property of the screen was that the total diffusing reflectivity was not more than 1.5%, which was ¼ that of a conventional dispersion type screen. Therefore, the color hue in shadow areas of images reproduced thereon was completely black and image contrast was markedly increased, whereby color and image gradation were clearly and accurately reproduced.

While the invention has been described in detail and with reference to specific embodiments thereof, it will be apparent to one skilled in the art that various changes and modifications can be made therein without departing from the spirit and scope thereof.

What is claimed is:

1. A rear projection screen comprising a wax which is solid at room temperature and a wax reforming agent which is miscible with the wax and is present in an amount from about 0.1 to 80 weight % based on the total weight of the composition.

2. The rear projection screen of claim 1, wherein the wax is a synthetic wax which is solid at room temperature.

3. The rear projection screen of claim 2, wherein the synthetic wax is an oligomer wax which is solid at room temperature.

4. The rear projection screen of claim 3, wherein the oligomer wax is selected from the group consisting of an ethylene oligomer wax, a propylene oligomer wax, an ethylene oxide oligomer wax, and a propylene oxide oligomer wax.

5. The rear projection screen of claim 4, wherein the ethylene oligomer wax and propylene oligomer wax have a molecular weight of not more than about 10,000 and a melt index of not less than about 1,000, determined according to JISK 6760, 1971.

6. The rear projection screen of claim 1, wherein the wax reforming agent is selected from the group consisting of an ethylene-vinyl acetate copolymer, polyisobutylene, polybutene, and atactic propylene.

7. The rear projection screen of claim 6, wherein the wax reforming agent is an ethylene-vinyl acetate copolymer.

8. The rear projection screen of claim 7, wherein the ethylene vinyl acetate copolymer comprises from about 15 to about 40 weight % vinyl acetate and has a melt index of from about 200 to about 400, determined according to JISK 6760, 1971.

9. The rear projection screen of claim 8, wherein from about 1 to 50 weight % of ethylene-vinyl acetate copolymer is present, based on the total composition weight.

10. The rear projection screen of claim 2, wherein the synthetic wax is a mixture comprising two or more members of the group consisting of an ethylene oligomer wax, a propylene oligomer wax, an ethylene oxide oligomer wax and a propylene oxide oligomer wax.

11. The rear projection screen of claim 1, wherein the wax reforming agent is a rosin.

12. The rear projection screen of claim 5, wherein the wax reforming agent is selected from the group consisting of an ethylene-vinyl acetate copolymer, polyisobutylene, polybutene, and atactic polypropylene.

13. The rear projection screen of claim 5, wherein the wax reforming agent is a rosin.

14. The rear projection screen of claim 12, wherein the wax reforming agent is an ethylene-vinyl acetate copolymer.

15. The rear projection screen of claim 14, wherein the ethylene-vinyl acetate copolymer comprises from about 15 to about 40 weight % vinyl acetate and has a melt index of from about 200 to about 400, determined according to JISK 6760, 1971.

16. The rear projection screen of claim 15, wherein from about 1 to about 50 weight % of ethylene-vinyl acetate copolymer is present, based on the total composition weight.

17. The rear projection screen of claim 10, wherein the ethylene oligomer wax and the propylene wax have a molecular weight of not more than about 10,000 and a melt index of not less than about 1,000, determined according to JISK 6760, 1971.

18. The rear projection screen of claim 17, wherein the wax reforming agent is selected from the group consisting of an ethylene-vinyl acetate copolymer, polyisobutylene, polybutene, and atactic polypropylene.

19. The rear projection screen of claim 17, wherein the wax reforming agent is a rosin.

20. The rear projection screen of claim 18, wherein the wax reforming agent is an ethylene-vinyl acetate copolymer.

21. The rear projection screen of claim 20, wherein the ethylene-vinyl acetate copolymer comprises from about 15 to about 40 weight % vinyl acetate and has a melt index of from about 200 to about 400, determined according to JISK 6760, 1971.

22. The rear projection screen of claim 21, wherein from about 1 to about 50 weight % of ethylene-vinyl acetate copolymer is present, based on the total composition weight.

* * * * *